US008594083B2

(12) United States Patent
Mishra

(10) Patent No.: US 8,594,083 B2
(45) Date of Patent: Nov. 26, 2013

(54) ISCSI AND FIBRE CHANNEL AUTHENTICATION

(75) Inventor: Chandan Mishra, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 945 days.

(21) Appl. No.: 11/097,613

(22) Filed: Apr. 1, 2005

(65) Prior Publication Data

US 2006/0221985 A1  Oct. 5, 2006

(51) Int. Cl.
*H04L 12/28* (2006.01)
*G06F 7/04* (2006.01)

(52) U.S. Cl.
USPC ............ 370/389; 370/395.2; 370/401; 726/2; 726/28

(58) Field of Classification Search
USPC .......................................................... 719/326
See application file for complete search history.

(56) References Cited

U.S. PATENT DOCUMENTS

| | | | | |
|---|---|---|---|---|
| 6,683,883 | B1 * | 1/2004 | Czeiger et al. | 370/401 |
| 7,024,695 | B1 * | 4/2006 | Kumar et al. | 726/26 |
| 7,089,293 | B2 * | 8/2006 | Grosner et al. | 709/217 |
| 7,200,610 | B1 * | 4/2007 | Prawdiuk et al. | 707/104.1 |
| 7,231,518 | B1 * | 6/2007 | Bakke | 713/168 |
| 7,287,269 | B2 * | 10/2007 | Burton et al. | 726/2 |
| 2002/0007412 | A1 * | 1/2002 | Paridaens et al. | 709/229 |
| 2003/0076788 | A1 * | 4/2003 | Grabauskas et al. | 370/254 |
| 2003/0105830 | A1 | 6/2003 | Pham et al. | |
| 2004/0221047 | A1 * | 11/2004 | Grover | 709/229 |
| 2005/0216767 | A1 * | 9/2005 | Mitsuoka et al. | 713/201 |
| 2005/0257274 | A1 * | 11/2005 | Shiga et al. | 726/28 |
| 2006/0039406 | A1 * | 2/2006 | Day et al. | 370/469 |
| 2006/0090198 | A1 * | 4/2006 | Aaron | 726/6 |
| 2006/0109850 | A1 * | 5/2006 | Otani et al. | 370/395.2 |

OTHER PUBLICATIONS

D. Black, "DH-CHAP" Diffie-Hellman Enhanced CHAP for iSCSI, Internet Draft Apr. 2002, 14 pages.
INCITS Working Draft Proposed, INCITS xxx-200x, T11/Project 1570-D/Rev 1.6 American National Standard for Information Technology, Jun. 10, 2004.
Christine Taylor Chudnow, "Fibre Channel Security", findartcles. com, Computer Technology Review, Mar. 2003, 3 pages.
Peter Wang, "Employing IP SAN's to address business needs—Storage Networking", findartcles.com, Computer Technology Review, Apr. 2003, 3 pgs.
International Search Report of the International Searching Authority for International Application No. PCT/US06/11473 mailed Mar. 19, 2008.
Written Opinion of the International Searching Authority for International Application No. PCT/US06/11473 mailed Mar. 19, 2008.
McCloghrie, Keith, "Status of the FC-SP MIB & Issues/Questions T11/06-604v1," Cisco Systems, Oct. 4, 2006, 17 pages.

(Continued)

*Primary Examiner* — Brandon Renner
(74) *Attorney, Agent, or Firm* — Weaver Austin Villeneuve & Sampson LLP

(57) ABSTRACT

Methods and apparatus are provided for authenticating an iSCSI initiator connected to a fiber channel storage area network. An iSCSI initiator performs an authentication exchange with a fiber channel target such as a fiber channel host or disk array through one or more fiber channel switches. Authentication information such as password information no longer is required at fiber channel switches and can instead be aggregated at fiber channel targets.

25 Claims, 8 Drawing Sheets

(56) References Cited

OTHER PUBLICATIONS

Chinese Office Action dated Sep. 14, 2010, Chinese Application No. 200680006581.3.

CN patent application No. 200680006581.3, Office Action mailed Dec. 31, 2011.

CN patent application No. 200680006581.3, Certificate of Grant 1051911 mailed Oct. 3, 2012.

* cited by examiner

ISCSI AND FIBRE CHANNEL AUTHENTICATION

BACKGROUND OF THE INVENTION

1. Field of the Invention

The present invention generally relates to storage area networks. More specifically, the present invention provides authentication mechanisms for iSCSI and fibre channel storage area networks.

2. Description of Related Art

The Internet Small Computer Systems Interface (iSCSI) allows connection of SCSI devices to storage area networks (SANs) using an Internet Protocol (IP) network. For example, an iSCSI initiator may be connected to a fibre channel switch over an IP network. The fibre channel switch may be connected to multiple hosts and disk arrays over a fibre channel storage area network.

In conventional implementations, security is provided by having a fibre channel switch authenticate various entities before allowing the entities to establish a connection. For example, an iSCSI initiator would perform an authentication exchange with the fibre channel switch in order to authenticate itself to the fibre channel switch. Storage area network entities such as disk arrays would also have to authenticate themselves to the fibre channel switch.

A fibre channel storage area network entity such as a disk array would also have to authenticate various entities before allowing the entities to establish a connection. For example, a host connected to the disk array would perform an authentication exchange with the disk array in order to authenticate itself to the disk array. However, having authentication performed at a number of different entities leads to a variety of inefficiencies.

Consequently, it is therefore desirable to provide methods and apparatus for improving the ability to authenticate initiators connected to a fibre channel storage area network.

SUMMARY OF THE INVENTION

Methods and apparatus are provided for authenticating an iSCSI initiator connected to a fibre channel storage area network. An iSCSI initiator performs an authentication exchange with a fibre channel target such as a fibre channel host or disk array through one or more fibre channel switches. Authentication information such as password information no longer is required at fibre channel switches and can instead be aggregated at fibre channel targets.

In one embodiment, a fibre channel switch is provided. The fibre channel switch is connected to an Internet Small Computer Systems Interface (iSCSI) initiator and a fibre channel target. The fibre channel switch includes an iSCSI interface, a processor, and fibre channel interface. The iSCSI interface is configured to receive a first authentication negotiation message from an initiator. The authentication negotiation message identifies multiple authentication algorithms. The processor is coupled to the iSCSI interface. The processor is configured to translate the first authentication negotiation message into a second authentication negotiation message for a fibre channel fabric. The fibre channel interface is configured to transmit a second authentication negotiation message from the fibre channel switch to the fibre channel target. The second authentication negotiation message corresponds to the first authentication negotiation message.

In another embodiment, a technique for providing authentication between an initiator and a fibre channel target is described. A first authentication negotiation message is received at a fibre channel switch from an initiator connected to the fibre channel switch. The authentication negotiation message identifies multiple authentication algorithms. A second authentication negotiation message is transmitted from the fibre channel switch to the fibre channel target. The second authentication negotiation message corresponds to the first authentication negotiation message. A first authentication challenge message is received at the fibre channel switch from the fibre channel target. The authentication challenge message includes a random sequence. A second authentication challenge message is transmitted to the initiator. The second authentication challenge message corresponds to the first authentication challenge message.

In another embodiment, a data center is provided. The data center includes an iSCSI initiator, a fibre channel disk array, and a fibre channel switch. The fibre channel switch is connected to the iSCSI initiator and the fibre channel disk array. The fibre channel switch is configured to receive a first authentication negotiation message from the initiator and transmit a second authentication negotiation message to the fibre channel disk array. The fibre channel disk array uses the second authentication negotiation message along with password information for the iSCSI initiator to begin authenticating the iSCSI initiator.

In yet another embodiment, a financial data storage area network is provided. The financial data storage area network includes an iSCSI initiator, a fibre channel host, a fibre channel disk array; and a fibre channel switch. The fibre channel switch is connected to the iSCSI initiator and the fibre channel disk array. The fibre channel switch is configured to receive a first authentication negotiation message from the initiator and transmit a second authentication negotiation message to the fibre channel disk array. The fibre channel disk array uses the second authentication negotiation message along with password information for the iSCSI initiator to begin authenticating the iSCSI initiator.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Figure 1:
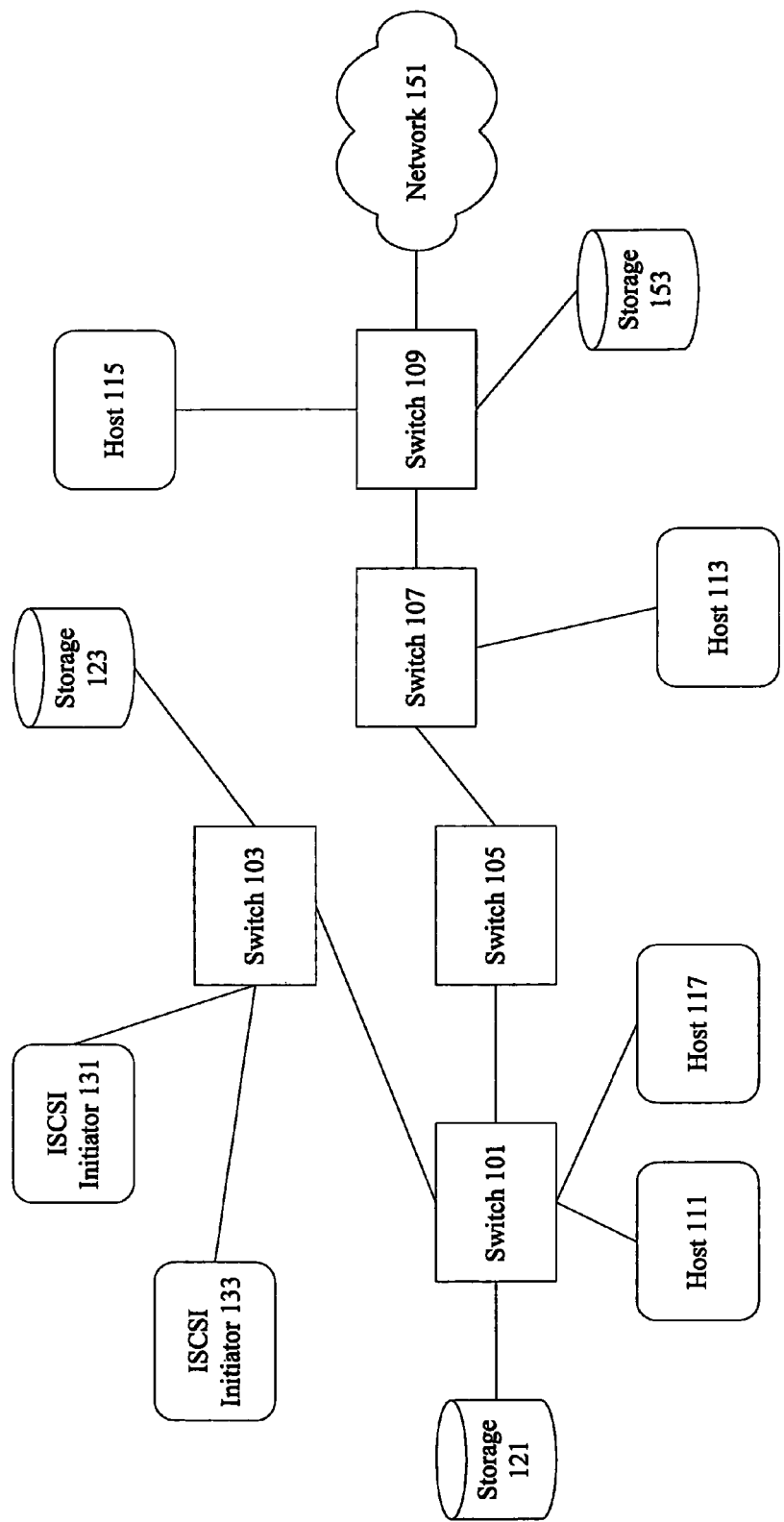
FIG. 1 is a diagrammatic representation showing a storage area network.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fibre channel networks and Internet SCSI (iSCSI). However, it should be noted that the techniques of the present invention can be applied to different variations and flavors of fibre channel and iSCSI. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

The Internet Small Computer Systems Interface (iSCSI) allows connection of SCSI devices to storage area networks (SANs) through a fibre channel switch having both fibre channel and IP interfaces. The fibre channel switch allows an iSCSI initiator to communicate with storage area network devices.

Authentication is a security mechanism that allows an entity such as a fibre channel switch to verify the identity of other entities such as disk arrays and initiators. Authentication capabilities are often provided at multiple entities in a storage area network. For example, a fibre channel switch is typically provided with mechanisms to authenticate iSCSI initiators and fibre channel disk arrays before iSCSI initiators and fibre channel disk arrays are allowed to establish a connection with the switch. Passwords for various iSCSI initiators and fibre channel disk arrays are maintained at a fibre channel switch. Disk arrays are also provided with mechanisms to authenticate fibre channel hosts and iSCSI initiators before allowing the establishment of a connection. Authentication exchanges are run between fibre channel switches and iSCSI initiators. Authentication exchanges are also run between storage area network devices and fibre channel switches and between different storage area network devices. Passwords for iSCSI initiators and fibre channel hosts are maintained at a disk array to allow authentication.

Authentication is performed at multiple entities even though the same device, such as an iSCSI initiator, is being authenticated. Having authentication in multiple places leads to administrative inefficiencies and complexities. In some instances, centralized password management services such as a RADIUS server is used to allow some simplification. However, even with RADIUS servers, settings have to be configured at multiple entities.

Consequently, the techniques of the present invention contemplate providing combined iSCSI authentication and fibre channel authentication. An iSCSI initiator can be authenticated at a fibre channel device using a single authentication exchange. Passwords no longer have to be maintained at numerous entities. According to various embodiments, passwords are maintained only at fibre channel disk arrays. Authentication is aggregated at the end device. Support for the authentication can also be optionally provided at fibre channel switches.

Fibre channel end devices such as disk arrays are able to authenticate iSCSI initiators rather than just a fibre channel switch. Authentication configuration is no longer required at fibre channel switches.

FIG. 1 is a diagrammatic representation of one example of a storage area network that uses the techniques of the present invention. A switch 101 is coupled to switches 103 and 105 as well as to host 111, host 117, and storage 121. In one embodiment, host 111 is a server or client system while storage 121 is any storage subsystem such as a single disk or a redundant array of independent disks (RAID). Switch 105 is coupled to switch 107. In typical implementations, switches 101-109 provide only very course statistical information on traffic flows, such as total frames transmitted or frame count. Switch 107 is connected to host 113 and switch 103 is connected to storage resource 123. Switch 103 is also connected to iSCSI initiators 131 and 133 over an IP network. Switch 109 is connected to host 115, switch 107, storage resource 153, and an external network 151 that may or may not use fibre channel. In order for a host 111 to access external network 151, a path going through switch 105 can be used. It should be noted that any apparatus including a processor, memory, and a connection to a fibre channel fabric can be referred to as a fibre channel switch.

Ports used to connect switches to each other in a fibre channel network are referred to herein as non fabric-port. Non fabric-ports include interswitch ports (E-ports). Ports used to connect a switch to a host are referred to herein as fabric-ports (F-ports). In one example, E-ports are used to connect switch 105 to switch 107 while F-ports are used to connect switch 107 to host 113. Similarly, fabric loop-ports (FL-ports) are used to connect switch 103 to storage resource 123.

According to various embodiments, a packet transmitted from host 111 to a network 151 or to storage resource 153 includes parameters such as the exchange identifier, a sequence, and a sequence number. The exchange identifier can provide information on what exchange the packet belongs to. The sequence can provide information on what portion of the exchange the packet belongs to while the sequence number can provide information on how the packets should be ordered. Sequence numbers can be used to allow for in order delivery of fibre channel packets.

Storage resources 123 and 153 may be fabric loops coupled respectively to switches 103 and 109 through FL-ports. The fabric loops typically include multiple storage devices. In one example, a loop is a Small Computer Systems Interface (SCSI) loop that allows connection of 8 or 16 devices in a half-duplex framework.

Figure 2:
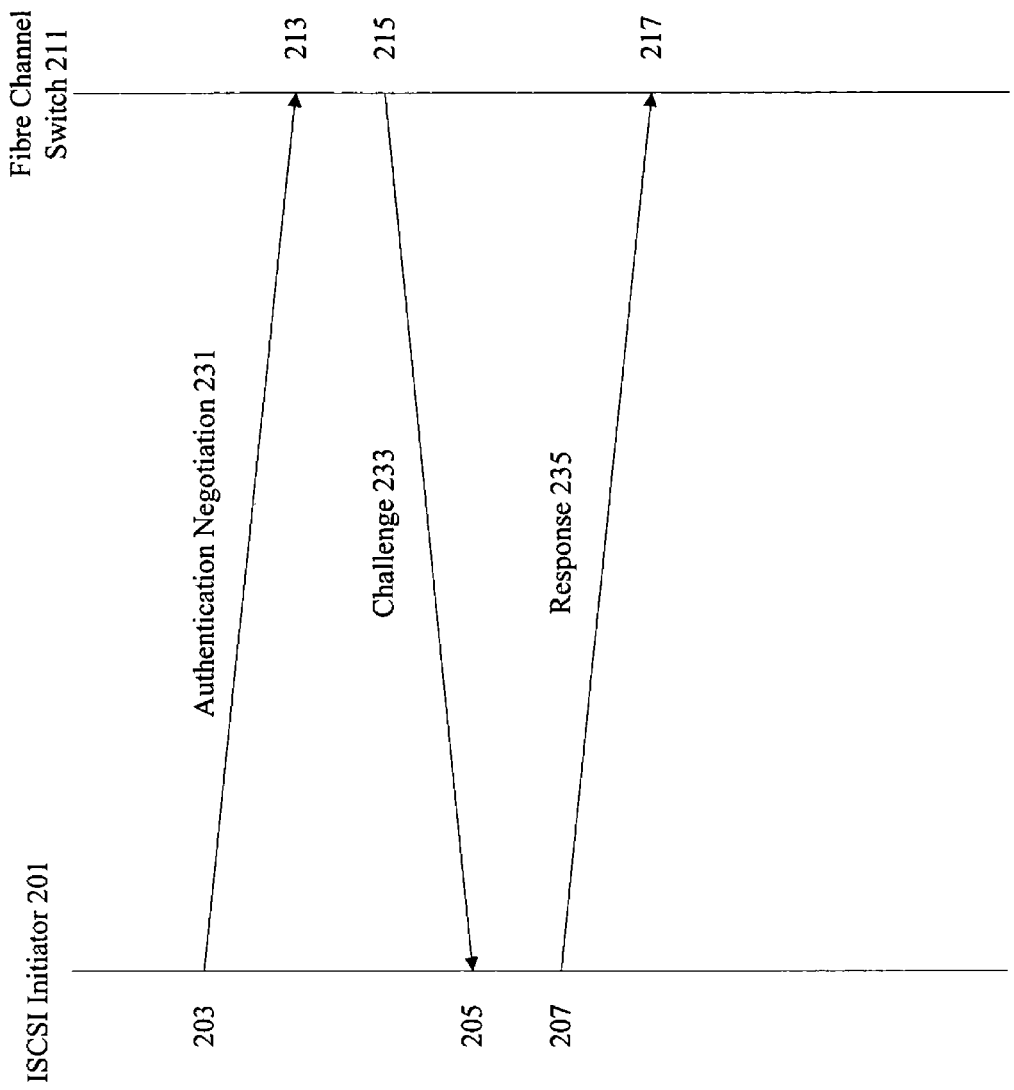
FIG. 2 is a transaction diagram showing authentication between an iSCSI initiator and a fibre channel switch.

FIG. 2 is a diagrammatic representation showing an authentication exchange between an iSCSI initiator 201 and a fibre channel switch 211. In one example, the exchange is a Diffie Hellman Challenge and Handshake Authentication Protocol (DHCHAP) exchange.

DHCHAP is a password based authentication and key management protocol augmented with an optional Diffie-Hellman algorithm. DHCHAP provides unidirectional or bidirectional authentication between an iSCSI initiator 201 and a switch 211.

According to various embodiments, an iSCSI initiator 201 sends an authentication negotiation message 231. In the authentication negotiation message 343, the iSCSI initiator 201 sends its own name and a list of proposed authentication protocols and parameters for the remainder of the exchange. The list of authentication protocols and parameters includes possible hash functions such as SHA1 and MD5 and the list of Diffie-Hellman Group Identifiers that may be used. The fibre channel switch 211 responds with a challenge message 233.

The challenge message includes the name of the switch 211, the hash function, and the DH group identifier selected from the ones proposed by the initiator 201. The challenge message 233 also includes a challenge value, such as a unique random sequence, and a DH parameter. The iSCSI initiator sends a response 235 to the switch 211. The switch 211 then verifies the response to authenticate the initiator 201.

Figure 3:
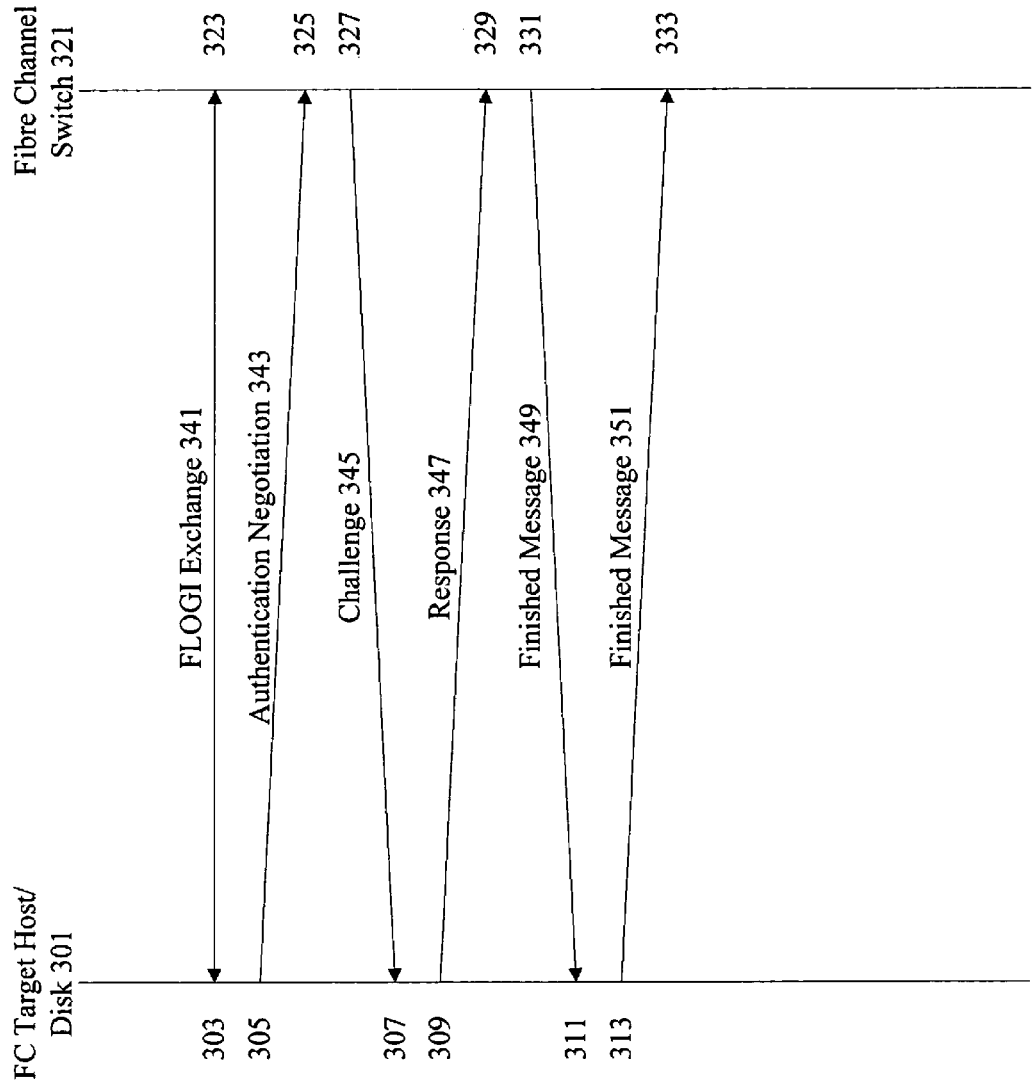
FIG. 3 is a transaction diagram depicting authentication between a fibre channel switch and a fibre channel target host/disk.

FIG. 3 is a diagrammatic representation showing an authentication exchange between a fibre channel switch and a fibre channel target host/disk. In one example, the exchange is a Diffie Hellman Challenge and Handshake Authentication Protocol (DHCHAP) exchange.

DHCHAP is a password based authentication and key management protocol augmented with an optional Diffie-Hellmann algorithm. DHCHAP provides unidirectional or bidirectional authentication between a fibre channel switch and a fibre channel target. In order to authenticate with the DH-CHAP protocol, each entity has access to a shared secret. In some instances, a third party entity allows for remote user authentication and accounting.

According to various embodiments, a fibre channel target host/disk 301 performs a fabric login exchange 341 with a fibre channel switch 321. Various configuration messages are sent to connect the target 301 to the switch 321. An authentication exchange begins with target 301 sending an authentication negotiation message 343. In the authentication negotiation message 343, the target 301 sends its own name and a list of proposed authentication protocols and parameters for the remainder of the exchange. The list of authentication protocols and parameters includes possible hash functions such as SHA1 and MD5 and the list of Diffie-Hellman Group Identifiers that may be used. The fibre channel switch 321 responds with a challenge message 345.

The challenge message includes the name of the switch 321, the hash function, and the DH group identifier selected from the ones proposed by the target 301. The challenge message 345 also includes a challenge value, such as a unique random sequence, and a DH parameter. The target sends a response 347 with a result calculated using the challenge value. The target also sends its own DH parameters. For a bidirectional exchange, the response 347 may also include a challenge value.

If the authentication succeeds, the switch 321 replies with a success finish message 349 to indicate that the target has been authenticated. The target may also respond with a success finished message 351.

Although one particular authentication exchange is described, it should be recognized that a variety of exchanges and variations can be used. Optional parameters or additional values may be exchanged. Bidirectional and unidirectional authentication are supported. In many instances, a target and a switch independently calculate and verify response values using shared secrets and challenge values provided by the other entity. The shared secret does not need to be transmitted over the network between the two entities.

Figure 4:
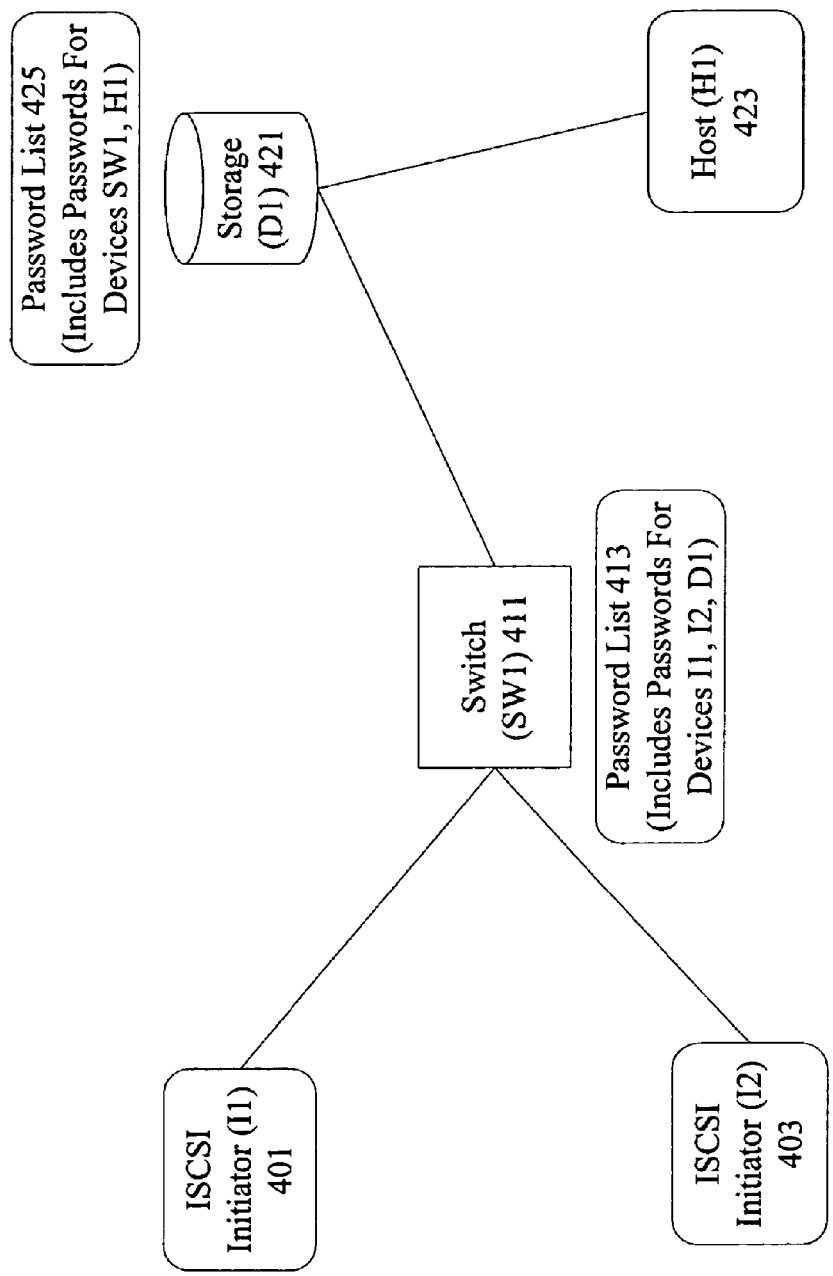
FIG. 4 is a diagrammatic representation showing password management.

FIG. 4 is a diagrammatic representation showing maintenance of authentication information such as passwords. A switch 411 (SW1) is connected to iSCSI initiators 401 (I1) and 403 (I2). The switch 411 is also connected to storage device 421 (D1). It should be noted that the switch 411 may be connected to storage 421 through one or more intermediary switches. In one embodiment, the switch 411 is a fibre channel switch connected to a storage area network. Storage 421 can be a disk array 421 including multiple physical disks. Storage 421 is connected to host 423 (H1).

According to various embodiments, switch 411 is connected to iSCSI initiators 401 and 403 over an IP network. Switch 411 is connected to storage 421 over a fibre channel storage area network. Storage 421 is similarly connected to fibre channel host 423 over a fibre channel storage area network.

In typical implementations, a system administrator is required to configure switch 411 to maintain authentication information such as passwords for iSCSI initiators 401 and 403 as well as for storage 421. A system administrator also is required to configure storage 421 to maintain authentication information such as passwords for switch 411 as well as for host 423. Password management can become very cumbersome. Furthermore, a storage device 421 is not directly authenticating the device accessing information on the storage device 421.

Password management services such as RADIUS allow centralized management of password information. However, individual entities such as switch 411 and storage 421 still have to be configured with RADIUS parameters. Furthermore, an overlay network for all storage area network switches is required. Having an additional network increases system complexity.

Figure 5:
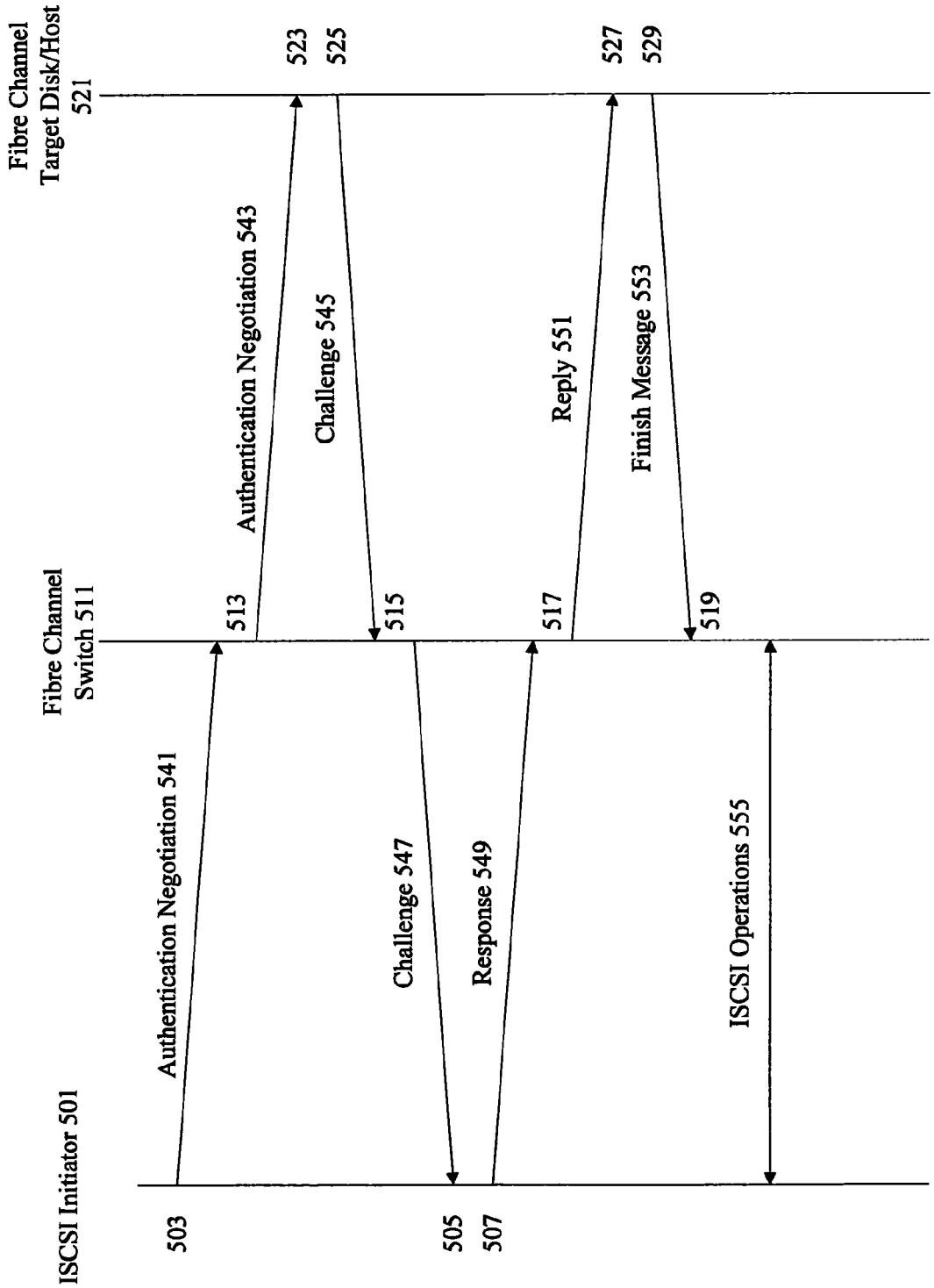
FIG. 5 is a transaction diagram showing initiator target authentication.

FIG. 5 is a diagrammatic representation showing an authentication exchange between an iSCSI initiator and a fibre channel target. Any authentication exchange between an iSCSI initiator and a fibre channel target is referred to herein as a combined iSCSI-FC authentication exchange. In one example, the combined exchange is a combined Diffie Hellman Challenge and Handshake Authentication Protocol (DH-CHAP) exchange. According to various embodiments, the combined exchange provides unidirectional or bidirectional authentication between an iSCSI initiator 501 and a fibre channel target 521.

According to various embodiments, an iSCSI initiator 501 sends an authentication negotiation message 541 to a fibre channel switch 511. In the authentication negotiation message 541, the iSCSI initiator 501 sends its own name and a list of proposed authentication protocols and parameters for the remainder of the exchange. The list of authentication protocols and parameters includes possible hash functions such as SHA1 and MD5 and the list of Diffie-Hellman Group Identifiers that may be used. The fibre channel switch 511 forwards the authentication negotiation message 543 to the fibre channel target 521. The authentication negotiation message 543 may be substantially similar to the authentication negotiation message 541, or may include modifications based on network formats. The fibre channel target 521 responds with a challenge message 545.

The challenge message includes the name of the target 521, the hash function, and the DH group identifier selected from the ones proposed by the initiator 501. The challenge message 545 also includes a challenge value, such as a unique random sequence, and a DH parameter. The challenge message 545 may be modified and forwarded as challenge message 547 to the iSCSI initiator 501. The iSCSI initiator sends a response 549 to the switch 511. The switch 511 forwards the response 549 as a reply message 551 to the target 521. The target 521 then verifies the response to authenticate the initiator 501.

If the authentication succeeds, the target 521 sends a success finish message 553 to indicate that the target has been authenticated. The target may also respond with a success finished message 351.

Although one particular authentication exchange is described, it should be recognized that a variety of exchanges and variations can be used. Optional parameters or additional values may be exchanged. Bidirectional and unidirectional authentication are supported. In many instances, a target and a switch independently calculate and verify response values using shared secrets and challenge values provided by the other entity.

Figure 6:
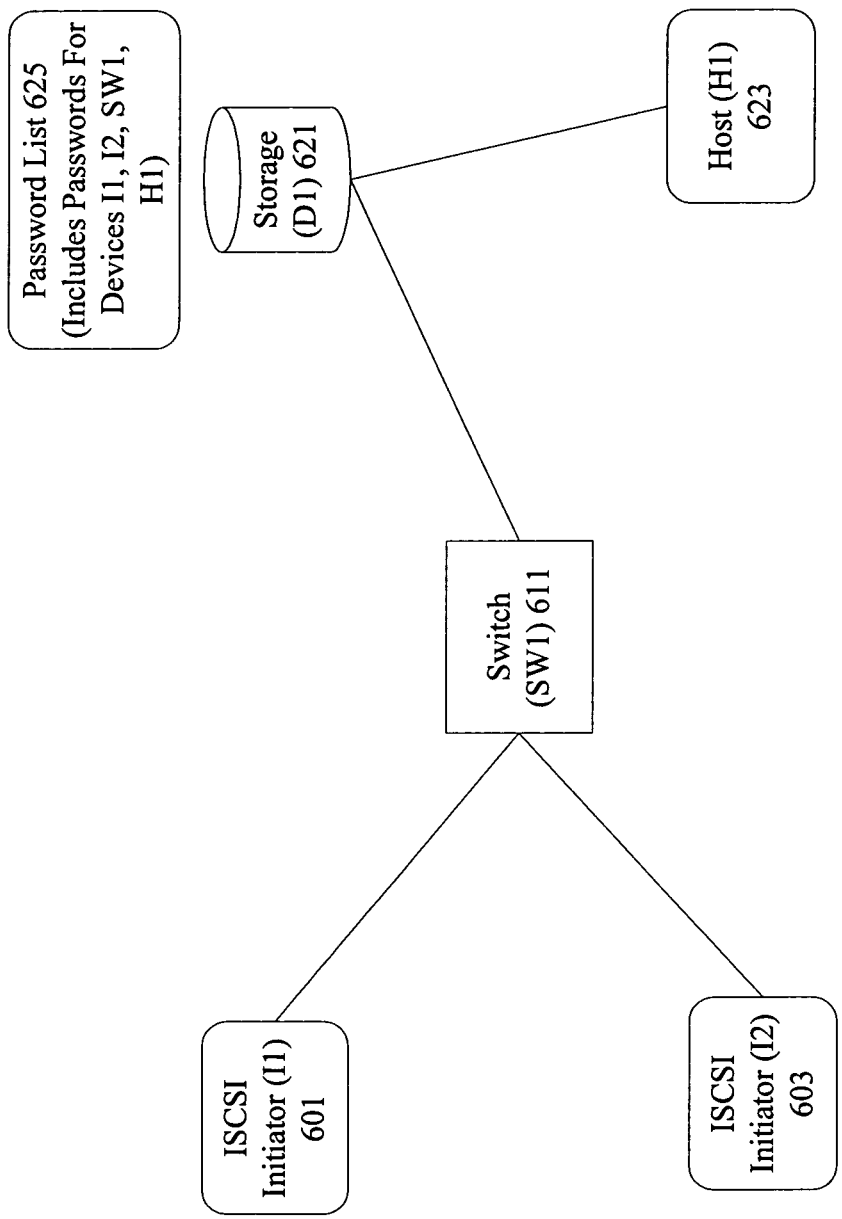
FIG. 6 is a diagrammatic representation depicting initiator target password management.

FIG. 6 is a diagrammatic representation showing maintenance of authentication information such as passwords. A switch 611 (SW1) is connected to iSCSI initiators 601 (I1) and 603 (I2). The switch 611 is also connected to storage device 621 (D1). It should be noted that the switch 611 may be connected to storage 621 through one or more intermediary switches. In one embodiment, the switch 611 is a fibre channel switch connected to a storage area network. Storage 621 can be a disk array 621 including multiple physical disks. Storage 621 is connected to host 623 (H1).

According to various embodiments, switch 611 is connected to iSCSI initiators 601 and 603 over an IP network. Switch 611 is connected to storage 621 over a fibre channel storage area network. Storage 621 is similarly connected to fibre channel host 623 over a fibre channel storage area network.

According to various embodiments, authentication information such as passwords for iSCSI initiators 601 and 603 no longer needs to be maintained at a switch 611. Storage 621 is configured to maintain authentication information such as passwords for switch 611, initiators 601 and 603, and host 623. Password management becomes targeted. Furthermore, a storage device 621 is directly authenticating the devices accessing information on the storage device 621. Password management services such as RADIUS can still be used but are not required.

Figure 7:
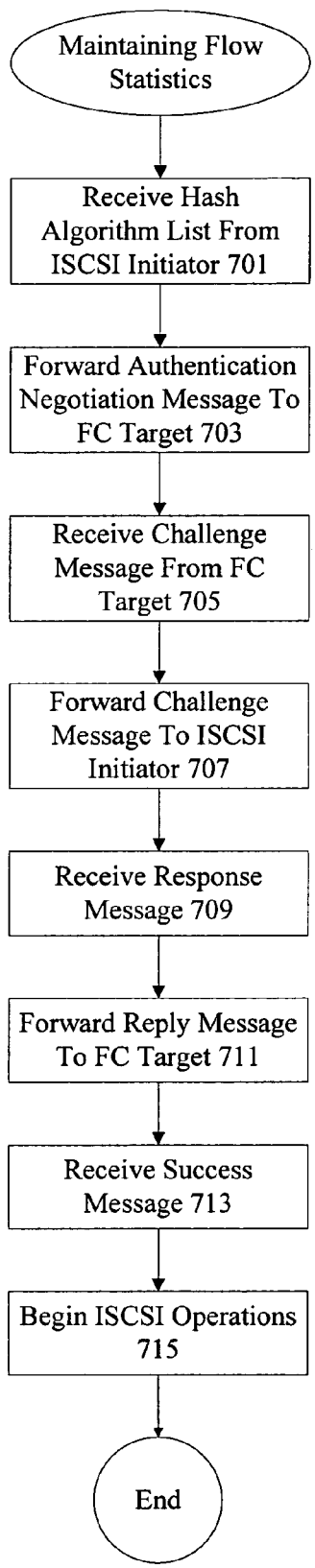
FIG. 7 is a process flow diagram showing message handling at a fibre channel switch.

FIG. 7 is a flow process diagram showing a technique for handling combined authentication at a fibre channel switch. At 701, a hash algorithm list is received from an iSCSI initiator 701. The hash algorithm list may included hash algorithms supported by the iSCSI initiator. At 703, an authentication negotiation message is forwarded to the appropriate fibre channel target. The fibre channel target may be an entity such as a fibre channel host or disk array. The authentication negotiation message includes information on hash algorithm support.

At 705, a challenge message is received from the fibre channel target. The challenge message may include public key information as well as a random sequence provided by the fibre channel target. The challenge message is forwarded to the iSCSI initiator at 707. A response message is received from the iSCSI initiator at 709. The information included in the response message is forwarded as a reply message to the fibre channel target at 711. If authentication is successful, a success message is received at 713. At 715, iSCSI operations such as disk accesses can begin.

Figure 8:
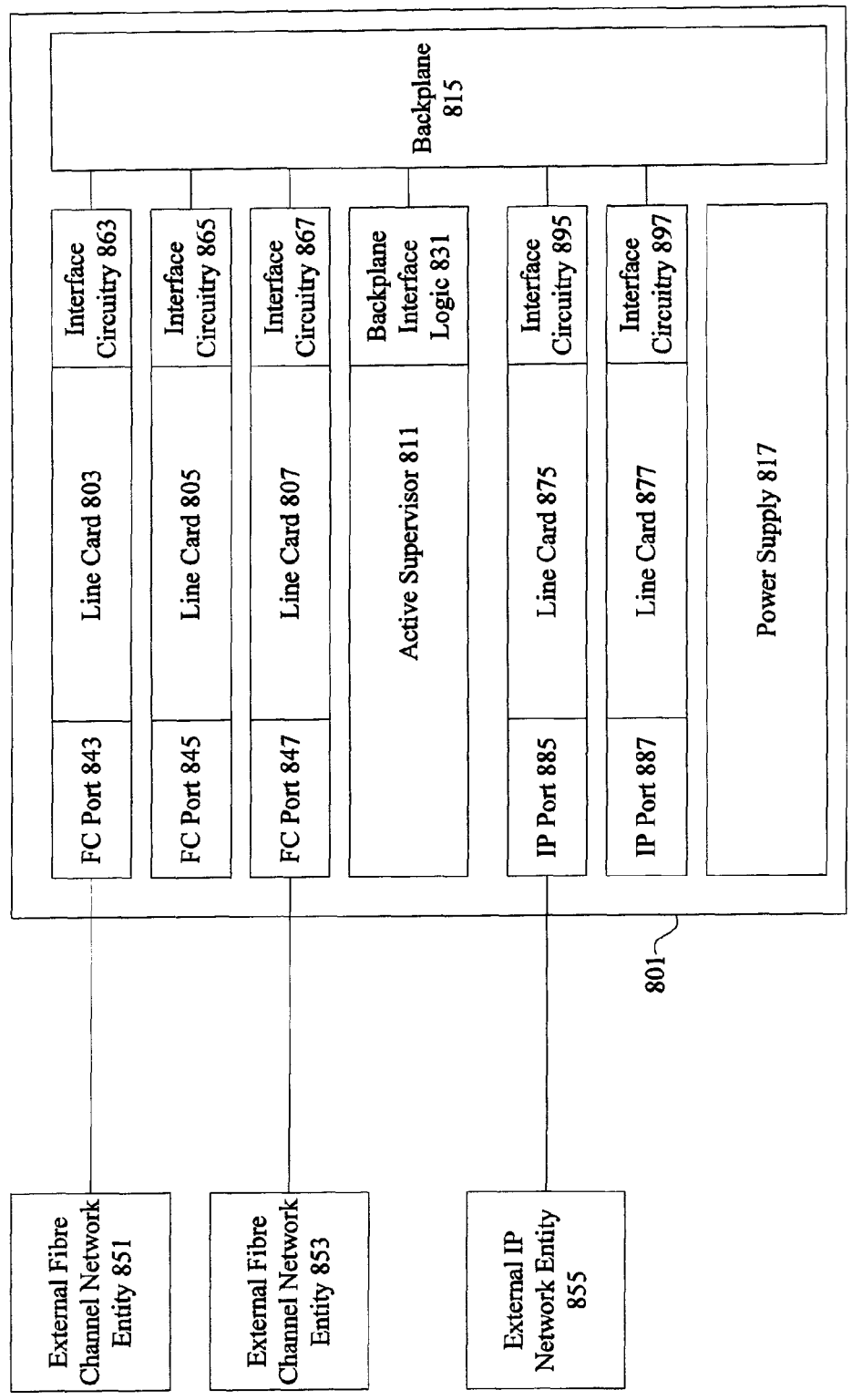
FIG. 8 is a diagrammatic representation showing a fibre channel switch.

FIG. 8 is a diagrammatic representation of one example of a fibre channel switch that can be used with the techniques and mechanisms of the present invention. Although one particular configuration will be described, it should be noted that a wide variety of switch and router configurations are available. The switch 801 may include one or more supervisors 811. According to various embodiments, the supervisor 811 has its own processor, memory, and storage resources.

Line cards 803, 805, and 807 can communicate with an active supervisor 811 through interface circuitry 863, 865, and 867 and the backplane 815. According to various embodiments, each line card includes a plurality of ports that can act as either input ports or output ports for communication with external fibre channel network entities 851 and 853. The backplane 815 can provide a communications channel for all traffic between line cards and supervisors. Individual line cards 803 and 807 can also be coupled to external fibre channel network entities 851 and 853 through fibre channel ports 843 and 847.

External fibre channel network entities 851 and 853 can be nodes such as other fibre channel switches, disks, RAIDS, tape libraries, or servers. The fibre channel switch can also include line cards 875 and 877 with IP ports 885 and 887. In one example, IP port 885 is coupled to an external IP network entity 855. The line cards 875 and 877 also have interfaces 895 and 897 to the backplane 815.

It should be noted that the switch can support any number of line cards and supervisors. In the embodiment shown, only a single supervisor is connected to the backplane 815 and the single supervisor communicates with many different line cards. The active supervisor 811 may be configured or designed to run a plurality of applications such as routing, domain manager, system manager, and utility applications.

According to one embodiment, the routing application is configured to provide credits to a sender upon recognizing that a packet has been forwarded to a next hop. A utility application can be configured to track the number of buffers and the number of credits used. A domain manager application can be used to assign domains in the fibre channel storage area network. Various supervisor applications may also be configured to provide functionality such as flow control, credit management, and quality of service (QoS) functionality for various fibre channel protocol layers.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

What is claimed is:

1. A fibre channel switch, comprising:
   an Internet Small Computer Systems Interface (iSCSI) interface configured to receive a first authentication negotiation message from an initiator connected to the fibre channel switch, the initiator being in a non-fibre channel network, the first authentication negotiation message identifying a plurality of authentication algorithms;
   a processor coupled to the iSCSI interface, the processor configured to translate the first authentication negotiation message into a second authentication negotiation message for a fibre channel fabric; and
   a fibre channel interface configured to transmit the second authentication negotiation message from the fibre channel switch to a fibre channel target, the second authentication negotiation message comprising information identifying the plurality of authentication algorithms and the initiator identified in the first authentication negotiation message, wherein the fibre channel interface is further configured to receive a first authentication challenge message from the fibre channel target, the first authentication challenge message including a random sequence and a selection of one of the plurality of authentication algorithms identified in the second authentication negotiation message, wherein the iSCSI interface is further configured to:
transmit a second authentication challenge message to the initiator, the second authentication challenge message corresponding to the first authentication challenge message, and receive a first response message from the initiator, the first response message responding to the second authentication challenge message, wherein the fibre channel interface is further configured to:
transmit a second response message to the fibre channel target, the second response message corresponding to the first response message, wherein the second response message is used by the fibre channel target to authenticate the initiator.

2. The fibre channel switch of claim 1, wherein passwords associated with the fibre channel switch and the initiator are maintained by the fibre channel target, and wherein the fibre channel switch does not maintain a password associated with the initiator.

3. The fibre channel switch of claim 2, wherein the first authentication negotiation message identifies a plurality of hash algorithms.

4. The fibre channel switch of claim 3, wherein a first authentication challenge message includes a public key and a random sequence.

5. The fibre channel switch of claim 1, wherein the initiator is an Internet Small Computer Systems Interface (iSCSI) initiator.

6. The fibre channel switch of claim 5, wherein the fibre channel target is a fibre channel storage area network disk array.

7. The fibre channel switch of claim 1, wherein authentication and response messages are selectively forwarded to the fibre channel target based upon whether the fibre channel target supports combined iSCSI and fibre channel authentication.

8. The fibre channel switch of claim 1, wherein authentication is bidirectional.

9. The fibre channel switch of claim 1, wherein the fibre channel switch is not configured to authenticate the initiator.

10. A method, comprising:
receiving a first authentication negotiation message at a fibre channel switch from an initiator, the initiator being connected to the fibre channel switch and located in a non-fibre channel network, the first authentication negotiation message identifying a plurality of authentication algorithms;

transmitting a second authentication negotiation message from the fibre channel switch to a fibre channel target, the second authentication negotiation message comprising information relating to the initiator and identifying the plurality of authentication algorithms identified in the first authentication negotiation message;

receiving a first authentication challenge message at the fibre channel switch from the fibre channel target in response to the second authentication negotiation message, the first authentication challenge message including a random sequence and a selection of one of the plurality of authentication algorithms identified in the second authentication negotiation message;

transmitting a second authentication challenge message to the initiator, the second authentication challenge message including the random sequence and the selection of the one of the plurality of authentication algorithms identified in the second authentication challenge message;

receiving a first response message from the initiator; and
transmitting a second response message to the fibre channel target, the second response message corresponding to the first response message, wherein the second response message is used by the fibre channel target to authenticate the initiator.

11. The method of claim 10, wherein passwords associated with the fibre channel switch and the initiator are maintained by the fibre channel target, and wherein a password associated with the initiator is not maintained by the fibre channel switch.

12. The method of claim 11, wherein the first authentication negotiation message identifies a plurality of hash algorithms.

13. The method of claim 12, wherein the first authentication challenge message includes a public key and a random sequence.

14. The method of claim 10, wherein the initiator is an Internet Small Computer Systems Interface (iSCSI) initiator.

15. The method of claim 14, wherein the fibre channel target is a fibre channel storage area network disk array.

16. The method of claim 10, wherein authentication and response messages are selectively forwarded to the fibre channel target based upon whether the fibre channel target supports combined iSCSI and fibre channel authentication.

17. The method of claim 10, wherein authentication is bidirectional.

18. A storage area network switch, comprising:
means for receiving a first authentication negotiation message from an initiator connected to the storage area network switch, the initiator being located in a non-fibre channel network, the authentication negotiation message identifying a plurality of authentication algorithms;

means for transmitting a second authentication negotiation message to a fibre channel target, the second authentication negotiation message comprising information relating to the initiator and identifying the plurality of authentication algorithms identified in the first authentication negotiation message;

means for receiving a first authentication challenge message from the fibre channel target in response to the second authentication negotiation message, the authentication challenge message including a random sequence and a selection of one of the plurality of authentication algorithms identified in the second authentication negotiation message;

means for transmitting a second authentication challenge message to the initiator, the second authentication challenge message including the random sequence and the selection of the one of the plurality of authentication algorithms identified in the second authentication challenge message;

means for receiving a first response message from the initiator; and means for transmitting a second response message to the fibre channel target, the second response message corresponding to the first response message, wherein the second response message is used by the fibre channel target to authenticate the initiator.

19. A data center, comprising:
an Internet Small Computer Systems Interface (iSCSI) initiator;
a fibre channel target; and
a fibre channel switch connected to the iSCSI initiator and the fibre channel target, the fibre channel switch configured to receive a first authentication negotiation message from the initiator, the initiator being in a non-fibre channel network, the first authentication negotiation message identifying a plurality of authentication algorithms, and transmit a second authentication negotiation message to the fibre channel target, the second authentication negotiation message comprising information relating to the iSCSI initiator and identifying the plurality of authentication algorithms identified in the first authentication negotiation message,
wherein the fibre channel target is configured to send a first authentication challenge message to the fibre channel switch in response to the second authentication negotiation message, the authentication challenge message including a random sequence and a selection of one of the plurality of authentication algorithms identified in the second authentication negotiation message,
wherein the fibre channel switch is further configured to transmit a second authentication challenge message to the iSCSI initiator, the second authentication challenge message corresponding to the first authentication challenge message,
wherein the fibre channel switch is further configured to receive a first response message from the iSCSI initiator, the first response message responding to the second authentication challenge message, and
wherein the fibre channel switch is further configured to transmit a second response message to the fibre channel target, the second response message corresponding to the first response message, wherein the second response message is used by the fibre channel target to authenticate the iSCSI initiator.

20. The data center of claim 19, wherein the first authentication challenge message comprises a Diffie Hellman Challenge Handshake Authentication Protocol (DHCHAP) challenge message supporting a combined iSCSI-FC authentication.

21. The data center of claim 20, wherein the first authentication negotiation message comprises a plurality of Diffie Hellman Group Identifiers, and wherein the first authentication challenge message indicates a selected one of the plurality of Diffie Hellman Group Identifiers.

22. The data center of claim 19, wherein the fibre channel target performs a combined iSCSI-FC authentication of the iSCSI initiator.

23. A data storage area network comprising:
an Internet Small Computer Systems Interface (iSCSI) initiator;
a fibre channel host;
a fibre channel disk array; and
a fibre channel switch connected to the iSCSI initiator and the fibre channel disk array, the iSCSI initiator being in a non-fibre channel network, the fibre channel switch configured to receive a first authentication negotiation message from the initiator, the first authentication negotiation message identifying a plurality of authentication algorithms, and transmit a second authentication negotiation message to the fibre channel disk array, the second authentication negotiation message comprising information relating to the iSCSI initiator and identifying the plurality of authentication algorithms identified in the first authentication negotiation message,
wherein the fibre channel disk array is configured to send a first authentication challenge message to the fibre channel switch in response to the second authentication negotiation message, the first authentication challenge message including a random sequence and a selection of one of the plurality of authentication algorithms identified in the second authentication negotiation message,
wherein the fibre channel switch is further configured to transmit a second authentication challenge message to the initiator, the second authentication challenge message corresponding to the first authentication challenge message,
wherein the fibre channel switch is further configured to receive a first response message from the initiator, the first response message responding to the second authentication challenge message, and
wherein the fibre channel switch is further configured to transmit a second response message to the fibre channel disk array, the second response message corresponding to the first response message, wherein the second response message is used by the fibre channel disk array to authenticate the iSCSI initiator.

24. The data storage area network of claim 23, wherein bidirectional authentication is performed between the iSCSI initiator and the fibre channel disk array.

25. The data storage area network of claim 23, wherein the fibre channel disk array is configured to store password information for the iSCSI initiator and the fibre channel host, and wherein the fibre channel switch is not configured to store password information for the iSCSI initiator.

* * * * *